Jan. 5, 1971  A. SIMON ET AL  3,553,695
HELICOPTER AIRBORNE BEACON SYSTEM FOR USE IN FORMATION FLYING
Filed Sept. 29, 1967  2 Sheets-Sheet 2
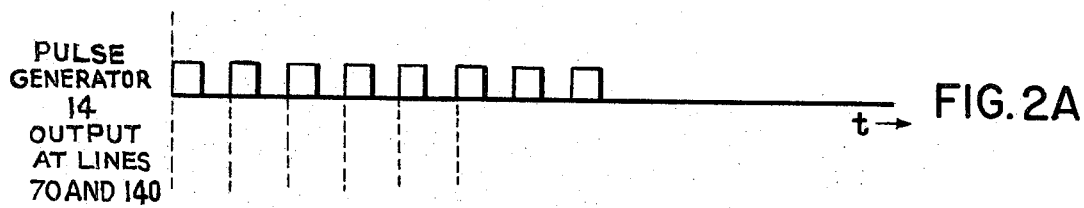
FIG. 2A — PULSE GENERATOR 14 OUTPUT AT LINES 70 AND 140
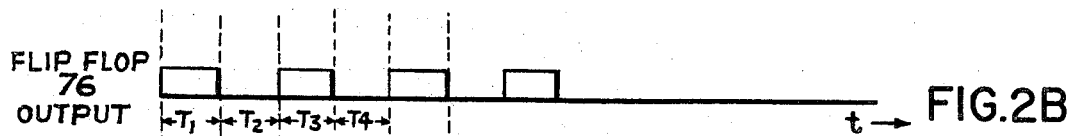
FIG. 2B — FLIP FLOP 76 OUTPUT
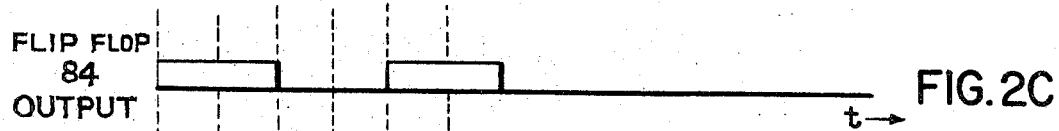
FIG. 2C — FLIP FLOP 84 OUTPUT
FIG. 2D — DIFF. 88 OUTPUT
FIG. 2E — DIFF. 96 OUTPUT
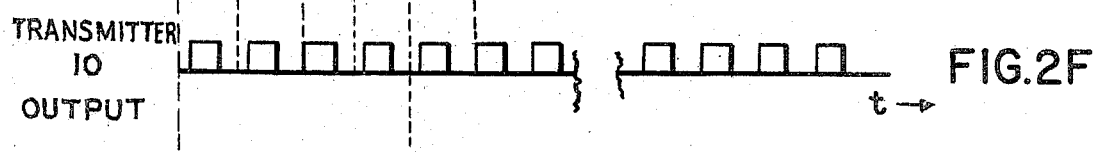
FIG. 2F — TRANSMITTER 10 OUTPUT
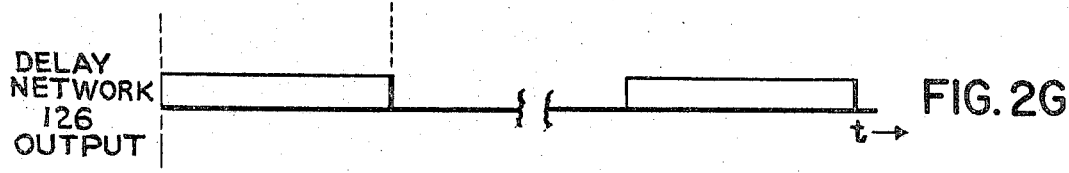
FIG. 2G — DELAY NETWORK 126 OUTPUT
INVENTORS
ARTHUR SIMON
WILLIAM C. TROLL
BY Herbert L. Davis
ATTORNEY

United States Patent Office 3,553,695
Patented Jan. 5, 1971

3,553,695
HELICOPTER AIRBORNE BEACON SYSTEM FOR USE IN FORMATION FLYING
Arthur Simon, Fairlawn, N.J., and William Charles Troll, Royal Oak, Mich., assignors to The Bendix Corporation, a corporation of Delaware
Filed Sept. 29, 1967, Ser. No. 671,765
Int. Cl. G01s 1/02
U.S. Cl. 343—101  13 Claims

ABSTRACT OF THE DISCLOSURE

A formation flying helicopter transmitting apparatus to sequentially transmit electromagnetic energy from four physically separated antennas positioned on a helicopter and outlining points thereof and to synchronize the energy transmission in accordance with predetermined positions of the helicopter rotor blades so as to minimize rotor modulation interference. The transmitter is provided with an optical rotor synchronization circuit to effect the energy transmission at the predetermined rotor blade positions and a circular assembly to automatically sequence the energy transmission from the respective antennas.

BACKGROUND—FIELD OF THE INVENTION

This invention relates to an airborne helicopter beacon transmitting system to transmit, from a plurality of antennas spaced on a helicopter, electromagnetic energy at intervals of time in accordance with the rotor positions which effect least rotor modulation interference on the transmitted signals.

BACKGROUND—DESCRIPTION OF THE PRIOR ART

This invention relates to a transmitting apparatus for all-weather helicopter formation flying, which apparatus may be utilized to effect a display of a pictorial image having multiple points of transmission from the lead helicopter, said signal transmission being used to effect on an optical display means a pictorial image of the points outlined on the lead or transmitting helicopter. The optical display means may be of a type such as disclosed and claimed in a U.S. application Ser. No. 624,785 filed Mar. 21, 1967 by Francis Henry Sand Rossire as a continuation-in-part of a U.S. application Ser. No. 315,188 filed Oct. 10, 1963, now abandoned (both of said applications being assigned to The Bendix Corporation).

In the prior art, formation flying apparatus has included transmission apparatus on a lead aircraft which emits signals from various points on the craft, particularly points in a vertical and horizontal plane whereby an indication of altitude and attitude with reference to the lead aircraft is effected on a display screen of an observing aircraft through suitable signal strength comparison receiving equipment.

Formation flying of helicopters present the additional problem of rotor modulation interference of the emitted signal from the transmitting helicopter, which signal is to be received from a following or observing helicopter. Further, signal transmissions from a plurality of antennas on different points of the transmitting helicopter must not necessarily be simultaneous in order to effect through suitable receiving equipment accurate indication of azimuth and elevation position on a pictorial display with respect to the position of the lead helicopter. Suitable receiving equipment for use in the observing craft is described in U.S. Pat. No. 3,237,195 issued Feb. 22, 1966, to Julius Schiffman and assigned to The Bendix Corporation.

In the present invention a single transmitter is provided with the plurality of antennas, on the helicopter, transmission from which is sequenced to prevent signal transmission simultaneously from two or more antennas. Further, the signal transmission sequence is synchronized with the operation and posiiton of the rotor blades so that the energy transmission occurs at instants of time when the rotor blades are in positions which cause the least rotor modulation interference upon the transmitted signals.

The operational life of prior art synchronization apparatus was short because of wearing and frictional parts, such as the parts in apparatus utilizing a mechanical projection from the rotor shaft which trips a switch upon rotation of the shaft. Further prior art electromagnetic pickoffs designed to detect the rotation of the shaft suffer from the requirement of small air gaps between elements, since the rotor shaft exhibits flexural movement during operation of the helicopter thereby varying the air gap. In the present invention, there are no wearing and frictional parts and operational life in thereby extended over the aforenoted shaft projection and switch arrangement. Further, rotor shaft flexure does not adversely affect the shaft position detection operation as it does when used with the aforenoted pickoff arrangement.

It should be further noted that for ease of installation and repair, particularly in a military field installation, apparatus to synchronize the transmitted signals in accordance with the rotor position must be easily accessible and repairable.

The prior art mechanical switch and the shaft pickoff arrangements, being located integral with the shaft, do not satisfy these requirements. On the other hand, the present invention utilizes a conventional infrared light source and sensor located on the helicopter body and reflective tape mounted on the rotor, the light sensor effecting an electrical signal in response to a reflection from the tape to effect through the transmitter microwave signals in sequence from the spaced antennas at the predetermined instants in time of least rotor modulation interference. The sensor and source herein are easily replaceable and accessible since they are located on the helicopter body.

SUMMARY OF THE INVENTION

In summary, the invention provides a helicopter transmitting apparatus for use in formation flying. It is accordingly an object of this invention to provide a means for synchronizing the operation of such an airborne transmitter so that the microwave signal pulses emitted from a plurality of spaced antennas on the helicopter follow one another in a fixed sequence with all antennas emitting a single microwave pulse within a fixed time interval so as to effectively eliminate certain spurious responses in the display caused by simultaneous emission of pulses from more than one antenna at one time, while providing for more accurate computing of certain data such as range and altitude of an observing aircraft in formation flight from the received pattern of pulses and the more effective utilization of display time when the optical display means is part of a complex time shared display.

It is a further object of this invention to provide a means for synchronizing the operation of an airborne transmitter effecting microwave radio signals from a plurality of spaced antennas on the aircraft at instants of time when the rotor blades of the helicopter are in a predetermined position corresponding to a position of minimum rotor modulation intereference.

It is a further object of this invention to provide, in a helicopter transmission apparatus, a mean for synchronizing radio signals emitted from a plurality of antennas on the helicopter in accordance with a predetermined rotor blade position and a circulator assembly to direct the microwave radio pulses from the transmitter to the plurality of antennas.

It is a further object of this invention to provide an optical sensing apparatus responsive to a predetermined rotor blade position to cause in a helicopter formation flying transmitter an electrical signal and thereby effect sequential signal transmission from a plurality of antennas operatively connected to the transmitter.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

Referring to the drawings in which corresponding numerals indicate corresponding parts in the several views:

FIGS. 2A through 2G inclusive are a series of graphical diagrammatic representations of the pulse signals at the indicated points of the electrical network of FIG. 1 and which have been shown graphically by the following diagrammatic representations:

FIG. 2A is a graphical diagrammatic representation of the pulse signal output, with respect to time, from a pulse generator 14.

FIG. 2B is a graphical diagrammatic representation of the pulse signal output, with respect to time, from a flip-flop 76.

FIG. 2C is a graphical diagrammatic representation of the pulse signal output, with respect to time, from a flip-flop 84.

FIG. 2D is a graphical diagrammatic representation of the pulse signal output, with respect to time, from a differentiator 88.

FIG. 2E is a graphical diagrammatic representation of the pulse signal output, with respect to time, from a differentiator 96.

FIG. 2F is a graphical diagrammatic representation of the pulse signal output, with respect to time, from a transmitter 10.

FIG. 2G is a graphical diagrammatic representation of the pulse signal output, with respect to time, from a delay network 126.

DESCRIPTION OF THE INVENTION

Figure 1:
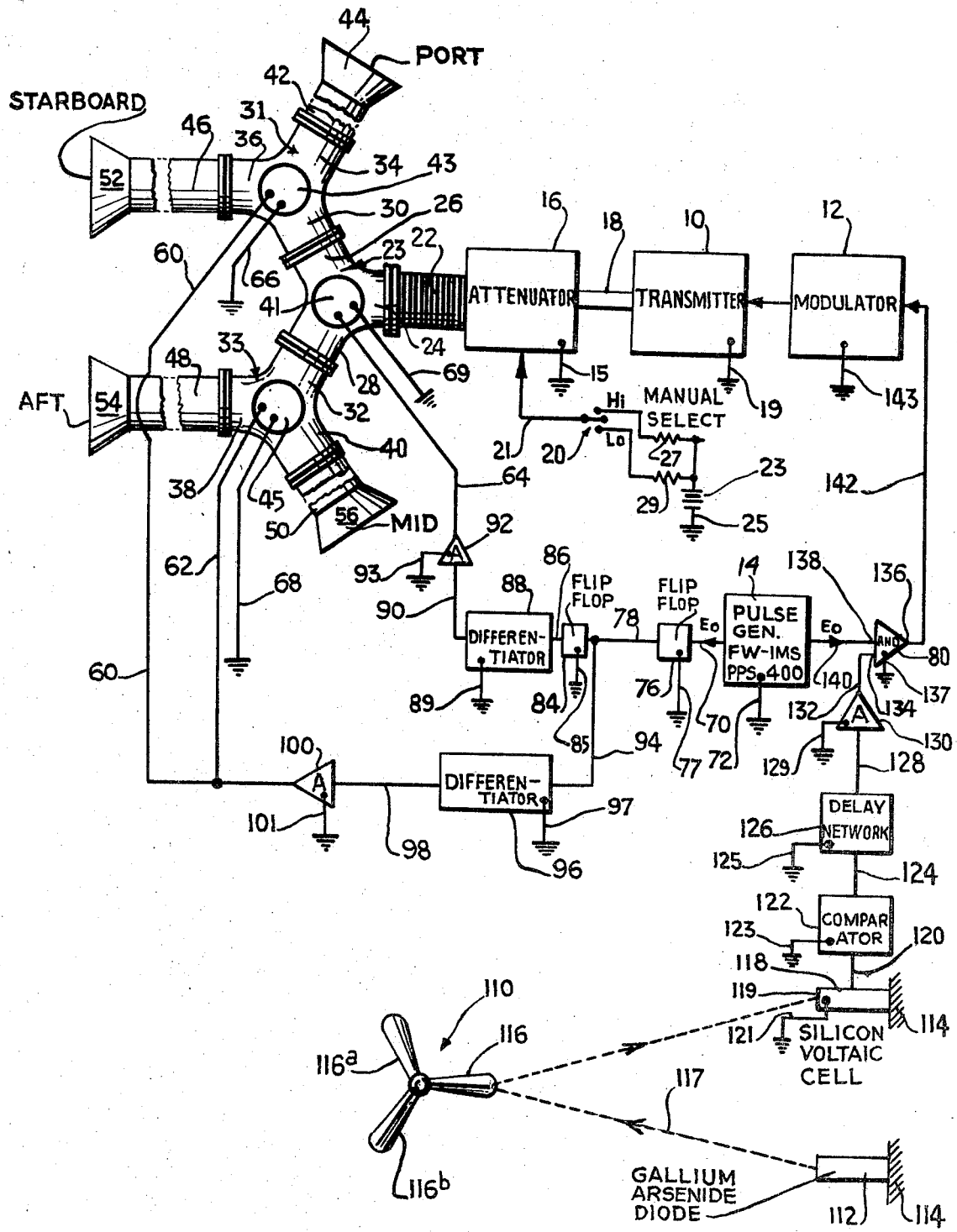
FIG. 1 is a diagram of the elements of a helicopter formation flying transmitting apparatus within the contemplation of the invention showing an electrical network and the antennas and circulators in plan view.

Referring to FIG. 1, the transmitter apparatus includes a transmitter 10, modulator 12 and pulse generator 14 of conventional type. A suitable peak power for such units is 5 kilowatts for one microsecond pulses transmitted at 400 pulses per second. A switchable attenuator 16 is provided connected to the transmitter 10 by a coaxial line 18 so that a pilot may choose a range of attenuation according to the proximity of the nearest helicopters in the formation. The attenuator 16 and transmitter 10 have grounded input-output lines 15 and 19 respectfully. The range of attenuation provided by the attenuator 16 is controlled by a switch 20 operative to effect the energization of a range control line 21 by selectively closing a conductive path from battery 23, grounded by line 25, through either the resistors 27 or 29, which resistors provide different electrical resistance to thereby permit the application of high or low current to attenuator 16 through the range control line 21 to thereby effect through conventional means provided in the attenuator 16 the range of attenuation provided thereby.

The attenuator 16 is connected through a wave guide 22 to a circulator 23 having a base leg 24 and two legs 26 and 28, which legs 26 and 28 are connected to bases 30 and 32, respectively, of additional circulators 31 and 33.

The circulator 31 has legs 34 and 36 projecting angularly 120° from each other, and from the base leg 30. The circulator 33 includes legs 38 and 40 also projecting angularly 120° from each other and from the base leg 32. The circulators 23, 31 and 33 are of a conventional latching type having control means 41, 43 and 45 each including a ferrite element (not shown) in the center of the three symmetrical junctions spaced 120° apart, of the three legs of each of the respective circulators 23, 31 and 33, whereby circulator action is obtained by biasing the control emans with an internal magnetic field of proper magnitude.

Microwave frequency energy from the transmiter 10 propagated to the base leg 24 of circulator 23 may be further propagated through leg 26 upon a positive pulse being applied to the control means 41 and through leg 28 upon a negative pulse being applied to control means 41. The bias of the control means 41 controls the energy propagation through the circulator from base leg 24 to leg 26 or from base leg 24 to leg 28. Similarly the circulators 31 and 33 operate in the same manner in accordance with the polarity of a pulse bias applied to the control means 43 and 45, respectively. Hereinafter, the function described whereby a pulse applied to the control means to control the selection of a leg of a circulator through which the microwave frequency energy is to be propagated will be designated as switching. A circulator type suitable for use in the present inventon is the rectangular wave guide ferrite Y-function circulators distributed by Trans-Tech Inc., 12 Meem Ave., Gaithersburg, Md., and design theory equations of which are discussed in "Operation of the Ferrite Junction Circulator" by C. E. Fay and R. L. Comstock, IEEE Trans. on Microwave Theory and Techniques, vol. MTT–13, pp. 15–27; January 1965.

The circulator 31 is attached to an aluminum wave guide 42 connected to a port antenna 44. The aluminum wave guide 42 and the wave guides hereinafter mentioned are broken away in FIG. 1 so as to show that the length thereof is dependent upon the actual distance from respective circulators 31 and 33 to respective transmitting antennas 44, 52, 54 and 56 positioned on the the helicopter. A wave guide 46 is connected to the starboard antenna 52 from circulator 31 and wave guides 48 and 50 are connected from legs 38 and 40 of circulator 33, respectively, to the aft antenna 54 and the mid antenna 56, respectively. The port, starboard, aft and mid designations of the antennas 44, 52, 54 and 56 are indicative of the physical positions of the four antennas on the helicopter.

Aluminum wave guides, such as aluminum wave guides 42, 46, 48 and 50 connecting to the antennas 44, 52, 54 and 56 are provided instead of a coaxial cable such as coaxial cable 18, since the aluminum wave guides effect lower energy losses at the frequency of transmission, particularly in the distance at which the power must be propagated from the transmitter 10 to the aft antenna 54.

The switching control of the circulators 23, 31 and 33 is provided in a conventional manner by the application of short duration alternating pulse signals to the control means 43 from input line 60 of circulator 31, control means 45 from input line 62 of circulator 33 and control means 41 from input line 64 of circulator 23. The control means 41, 43 and 45 have opposite input terminals which are grounded by lines 69, 66 and 68, respectively.

Referring to FIGS. 1 and 2A through 2G inclusive, the pulse generator 14, effecting pulses in the form, illustrated by FIG. 2A, is connected through at grounded output conductor 72 and a line 70 to an input of a flip-flop 76 having a grounded input-output conductor 77. The flip-flop 76 may be of the bistable multivibrator type arranged so as to effect on an output line 78 one pulse for every two pulses applied to the input line 70 leading to the flip-flop 76. These pulses on line 78 are of a duration twice the duration of the pulse from the pulse generator 14 as shown by the pulse diagram of FIG. 2B.

Line 78 is connected to a flip-flop 84 having a grounded input-output conductor 85 and which flip-flop 84 may be of the bistable multivibrator type to effect on an output line 86 one pulse for every two pulses on line 78 conducted to the flip-flop 84 and which pulses are of a duration twice the duration of the pulses from the flip-flop 76 as shown by the diagram of FIG. 2C.

A line 86 leads from flip-flop 84 and conducts signals therefrom to a conventional type differentiator 88 having a ground input-output conductor 89. Differentiator 88 differentiates the signals from flip-flop 84 causing a series of alternating pulses on a line 90 as shown by the diagram of FIG. 2D. The differentiator 88 is connected by line 90 to a power amplifier 92 having a grounded input-line 90 to a power amplifier 92 having a grounded input-output conductor 93 and an output connected by the line 64 to the control means 41 of circulator 23.

The line 78 from the flip-flop 76 is also connected by a line 94 to a second conventional type differentiator 96 having a grounded input-output conductor 97 and which differentiator 96 differentiates the pulses from flip-flop 76 and effects on a line 98 a series of pulses of alternate polarity of the wave form shown by the diagram of FIG. 2E and of twice the frequency of the pulses applied to line 90 by the differentiator 88, as may be seen by a comparison of the diagrams of FIGS. 2D and 2E. The line 98 is connected to a power amplifier 100 having a grounded input-output conductor 101. An output of the amplifier 100 leads to the input line 62 of the control means 45 of circulator 33 and input line 60 of the control means 43 of circulator 31 so as to control the switching action of the circulators 31 and 33.

The signal providing means is used to detect a predetermined position of the helicopter rotor generally indicated at 110 and to effect an electrical signal at a time when a rotor blade 116 is in the predetermined position at which rotor modulation interference upon a transmitter signal is at a minimum.

The signal providing means includes a gallium arsenide diode indicated generally by the numeral 112 and which may be suitably energized so as to provide a required light source. A suitable form of the diode 112 may provide 50 milliwatts of power in the infrared region of the spectrum. The diode 112 may be mounted beneath the rotor on the external portion of the body generally indicated by numeral 114 of the helicopter.

A reflective tape (not shown) may be placed on the under side of each rotor blade 116, 116A and 116B so that upon rotation, light from the diode light source 112 impinges upon the reflective tape as each rotor blade sequentially crosses the light beam indicated by the dotted line 117 so as to cause a reflection to a sensor 118 spectrally matched to the diode light source 112 and which may also be mounted on the helicopter external body generally indicated by numeral 114. The sensor 118 may be of a suitable type such as, for example, a diffused junction silicon voltaic cell type sensor. An infrared filter 119 may be placed on the sensor 118 to discriminate against the ambient light. The amount of incident energy from the sun approximately amounts to 5 microwatts as compared with the diode source 112 power of 50 milliwatts. Since the optical path is short, there is low path loss in light energy.

The sensor 118 is connected through a line 120 and a grounded output line 121 to a comparator amplifier 122 of conventional type having a grounded input-output conductor 123 provided to allow a threshold comparison so as to reject the ambient light signals below the threshold and to pass the signals effected in sensor 118 by the light reflections from the helicopter rotor blades 116, 116A and 116B.

The comparator 122 is connected to the delay network 126 by an output line 124 and a grounded input-output conductor 125 of the delay network 126 so as to effect at an output line 128 leading from the delay network 126 signal pulses of the waveform illustrated by the diagram of FIG. 2G. These pulses applied at the output line 128 are arranged so as to properly phase the sensed signal provided by the voltaic cell 114 with respect to the pulses from the pulse generator 14 at output line 140 which corresponds to the output at the output line 70. Thus, as shown graphically at FIG. 2G, there are provided at the output line 128 from the delay network 126 output pulses of a duration at least as long as the pulse generator 14 takes to emit four full pulses on the line 140, as shown by FIG. 2A.

The delay network 126 may consist of a pair of monostable multivibrators connected so that the output at line 128 leading from the delay network 126 is a pulse of predetermined duration and which pulse begins at some predetermined time after the time at which the input signal from the comparator 122 is applied to the input line 124 of the delay network 126 and which time is a function of the design parameters of the delay network 126. The predetermined time delay interval is the time between which the comparator 126 detects the signal from the sensor 118 and at the time at which the rotor blade 116 is in a position to effect the least modulation interference upon transmitted signals from antennas 44, 52, 54 and 56 on the helicopter.

The position of least rotor 110 modulation interference occurs when any one of the rotor blades 116, 116A and 116B is parallel with the helicopter body and pointing rearward of the helicopter. The delay network 126 is connected to the input of a conventional amplifier 130 by the output line 128. The amplifier 130 includes a grounded input-output conductor 129 and an output line 132 which leads from the output of amplifier 130 to an input 134 of an AND gate 80 also of conventional type and having a grounded input-output conductor 137. A second input 138 of the AND gate 80 is connected to the output line 140 from the pulse generator 14. The output of the AND gate 80 is connected through a line 142 to an input of the modulator 12 having a grounded input-output conductor 143.

OPERATION

In operation the pulse generator 14 effects a constant series of pulses on line 70 and simultaneously on line 140, as indicated by the pulse diagram of FIG. 2A. These driving pulses on the line 70 actuate the flip-flop 76 once for every two pulses appearing on line 70 so as to effect on line 78 a series of recurrent pulses which begins at instants in time corresponding to the rise of alternate pulses from pulse generator 14 as indicated in the pulse diagram of FIG. 2B. The pulse signals on line 78 from flip-flop 76 control the flip-flop 84 to effect a series of recurrent pulses, as shown graphically by FIG. 2C, which are of a duration twice the duration of the pulses from flip-flop 76 and which pulses begin at instants in time corresponding to the time of rise of alternate pulses from flip-flop 76.

The pulses from flip-flop 84 are differentiated in differentiator 88, as shown graphically by the differentiator 88 output diagram of FIG. 2D, and are amplified in the power amplifier 92 and conducted by line 64 to control means 41 of circulator 23 to control the switching action thereof. Immediately upon a positive pulse appearing on input line 64, the circulator 23 is switched so that microwave frequency signals, propagated from the transmitter 10 through line 18, attenuator 16, wave guide 22 and base leg 24 of circulator 23, are further propagated through the leg 26 of the circulator 23 to the base 30 of the circulator 31.

The differentiator 96 being responsive to signals from the flip-flop 76 causes on line 98 a positive pulse at the instant in time of a rise of a pulse from flip-flop 76 and a negative pulse at the instant in time of a drop of the pulse from the flip-flop 76. At the beginning of the interval $T_1$, as shown graphically by FIG. 2B, a positive pulse from the differentiator 96, as shown graphically by FIG. 2E, is applied through line 60 to the control means 43 of circulator 31 to immediately switch circulator 31 simultaneously with the switching of the circulator 23 so that microwave frequency signals propagated through leg 26 of circulator 23 to base leg 30 of circulator 31 are further propagated through the leg 34 of the circulator 31, wave guide 42 and radiated from port antenna 44.

At the beginning of the interval $T_2$ the differentiator 96 effects a negative pulse, as shown graphically in FIG. 2E, which as amplified in amplifier 100 is applied through line 60 to the control means 43 to switch circulator 31 so that a signal propagated to base leg 30 is further propagated through leg 36, wave guide 46 and radiated from starboard antenna 52.

At the beginning of time interval $T_3$, a negative pulse from differentiator 88 is applied through the line 64 to the control means 41 so as to switch the circulator 23 at the same time that a positive pulse from the differentiator 96 is applied through line 62 to the control means 45 so as to switch the circulator 33. In particular, the negative pulse signal conducted to the control means 41 of the circulator 23 controls energy propagation therein so that microwave frequency signals propagated from transmitter 10 to base leg 24 are further propagated through and out of leg 28 to the base leg 32 of the circulator 33. The circulator 33 is controlled by the positive pulse from the differentiator 96 as amplified in amplifier 100 so that energy propagated to the base leg 32 of the circulator 33 is further propagated through and out of leg 38, wave guide 48 and radiated from the aft antenna 54.

At the beginning of time interval $T_4$, the differentiator 96 effects a negative pulse, as shown graphically in FIG. 2E, and which pulse as amplified in amplifier 100 is applied through conductor 62 to the control means 45 to switch circulator 33 so that the microwave frequency energy propagated to the base leg 32 from the circulator 23 is further propagated through leg 40 to the wave guide 50 and radiated from mid antenna 56.

The time interval between the switching of the circulator 23 is twice the time interval between the switching of the circulators 31 and 33. Further, during the intervals $T_1$ and $T_2$, the circulator 33 is switched although no energy is propagated therethrough and during the intervals $T_3$ and $T_4$, the circulator 31 is switched although no energy is propagated therethrough.

After the time interval $T_4$, and as indicated by the waveform diagrams of FIGS. 2A through 26 inclusive, the cycle repeats itself such that the sequence of microwave frequency signal transmission continues, the antenna transmission sequence being microwave frequency pulse signals from the port antenna 44, starboard antenna 52, aft antenna 54 and mild antenna 56.

The synchronization of the firing sequence of microwave frequency signals from antennas 44, 52, 54 and 56 is initiated by the source 112 and sensor 118 when the light beam 117 from the source 112 is reflected from one of the rotor blades 116 of rotor 110 and impinges upon the sensor 118 effecting an electrical signal on line 120 to the comparator 122, which electrical signal being above the predetermined threshold value of comparator 122, causes a signal on line 124 to be applied to the delay network 126.

After the predetermined delay dependent upon the design parameters of the delay network 126, the delay network 126 effects an output signal on line 128 which is a pulse of duration at least as long as the time required for four pulses to be emitted from the pulse generator 14 on line 140 although the duration of a detected signal from sensor 118 may be, for instance, as long as the time between eight or twelve pulses, from pulse generator 14.

The pulse signal on line 128 is amplified in amplifier 130 and conducted by line 132 to the input 134 of the AND gate 80. The delay network 126 is operative to properly phase the signal output from AND gate 80 the predetermined time after a reflection from the rotor 110 of the light beam 117 originating in source 112. Upon a pulse being applied to the input 134 of the AND gate 80, at least four pulses are effected at an output 136 thereof, which four pulses are conducted through the output line 142 to the input of the modulator 12 so as to actuate transmitter 10 to transmit four microwave pulse signals. A slight delay of the modulated signal pulses effecting operation of transmitter 10 is an advantage in the present invention since each of the four pulses from the transmitter 10 is radiated from respective antennas 44, 52, 54 and 56 at a small interval of time after the operation of the switching function of the circulators 31, 33 and 23 directing each group of pulses to the respective antennas. That is, referring to the diagram of FIG. 2F at the beginning of time interval $T_1$, circulators 23 and 31 have switched such that the microwave frequency energy propagated from transmitter 10 to the base leg 24 of circulator 23 is then propagated through leg 26, and base 30 and leg 34 of circulator 31. The inherent slight interval delay in the modulator 12 and transmitter 10 effects the signal energy propagation, for instance, to port antenna 44 within the interval of time $T_1$, but slightly after the circulator 23 and 31 have switched accordingly. Similarly, circulator 31 switches, for signal transmission through leg 36, at an instant in time prior to the arrival time of the microwave signal pulse propagated therethrough which is emitted from the starboard antenna 52.

The pulse diagram of FIG. 2F is shown as broken away on the time axis to indicate that the transmitter 10 effects a series of four pulses on line 18 to attenuator 16 and wave guide 22 to the circulators 23, 31 and 33 only as each helicopter rotor blade 116 through 116B, respectively, reaches the predetermined position whereby the infrared light from source 112 is reflected by the rotor blades 116 to sensor 118.

The pulse diagram of FIG. 2F also illustrates that the time in which a signal is transmitted from each antenna 44, 52, 54 and 56 is a very small relative to the time from when one rotor blade 116, for instance, is rotated in flight from the position of reflection to the time at which an adjacent rotor blade, 116A for instance, assuming clockwise rotation, reaches the position of reflection. That is, the time between light reflections to the sensor 118 from the light source 112 is large compared to the time of one cycle of signal pulse transmission from each of the antennas 44, 52, 54 and 56.

The invention has provided a novel formation flying transmitting apparatus including a circuit to control the sequence of transmitted energy from a plurality of antennas located on outlining points of the helicopter and which sequence is initiated in accordance with a predetermined rotor blade position to avoid modulation circuit network to prohibit simultaneous pulse transmission from two or more antennas.

Although only one embodiment of the invention has been illustrated and described, various changes in the form and relative arrangements of the parts, which will now appear to those skilled in the art, including changes made in the mere number of rotor blades and antennas, may be made without departing from the scope of the invention. Reference is, therefore, to be had to the appended claims for a definition of the limits of the invention.

What is claimed is:

1. A system for transmitting microwave signals in predetermined sequence from antennas at various positions on a helicopter so as to avoid helicopter rotor modulation interference with the transmitted signals, the system comprising:

a signal pulse generator;

a light source mounted on and external of the helicopter body;

a reflector mounted on the under side of the blades of the rotor;

a light sensor mounted on and external to the helicopter body for producing an electrical signal upon light from said light source being reflected from the reflector on the rotor blades to said light sensor;

a microwave signal transmitter;

means responsive to the electrical signals from the light sensor and from the signal pulse generator to activate the transmitter to transmit microwave signals;

means for selectively applying the microwave signals transmitted to the antennas;

means connected to the signal pulse generator and responsive to signal pulses therefrom for producing signals of duration less than the duration of pulses from the signal pulse generator;

and means responsive to signals from the signal producing means for controlling the means for selectively applying the microwave signals from the transmitter to the antennas and thereby the direction of propagation of the microwaves from the antennas at various positions on the helicopter so as to avoid helicopter rotor modulation interference with the transmitted microwave signals.

2. The system as defined by claim 1 wherein the means responsive to the electrical signals from the light sensor and the signal pulse generator includes:

a comparator connected to the light sensor and effective to reject signals caused by ambient light upon the light sensor and to pass signals caused in the sensor upon light from the light source being reflected from the reflector on the rotor blades to the light sensor;

means for delaying the electrical signals from the comparator for a period of time between which an electrical signal from the sensor begins and a time when the helicopter rotor is in a position to effect a least rotor modulation interference with the transmitted signals;

an amplifier connected to the delay means; means for gating signals from the signal pulse generator and the amplifier;

a modulator between the transmitter and the gating means to modulate signals passed through the gating means, whereby the modulated signals activate the transmitter.

3. The system as defined by claim 1 wherein the means for selectively applying the microwave signals from the transmitter to the antennas includes:

a Y-junction circulator having a base leg and two other legs;

means connecting the base leg of the circulator to the transmitter; and means connecting the two other legs of the circulator to the antennas; and wherein the signal producing means includes: flip-flop means to count down current signals from the signal pulse generator and to effect recurrent signals of duration longer than the signal pulses from the signal generator; and means operatively connected between the control means and the flip-flop means to differentiate the recurrent signals from the flip-flop means so as to cause the control means to operate the Y-junction circulator so as to apply through one of the two other legs of the circulator microwave signals from the transmitter to one of the antennas upon a recurrent signal of one sense being applied to the control means and to apply through the other of the two other legs of the circulator microwave signals from the transmitter to another of the antennas upon a recurrent signal of another sense being applied to the control means.

4. The system as defined by claim 3 wherein the means connecting the two other legs of the circulators to the antennas includes:

a second circulator having a base leg and two other legs;

a third circulator having a base leg and two other legs;

means connecting the other legs of the second circulator and the two other legs of the third circulator to the antennas;

wherein the flip-flop means includes:

a first flip-flop connected to the pulse generator to produce a signal of substantially twice the duration of the signal from the pulse generator;

a second flip-flop connected to the first flip-flop to produce a signal of substantially twice the duration of the signal from the first flip-flop; and wherein the means operatively connected between the control means and the flip-flop means includes:

a differentiator connected to the first flip-flop to differentiate the pulses from the first flip-flop;

a second differentiator connected to the second flip-flop to differentiate the pulses from the second flip-flop;

means responsive to the differentiated pulses from the second differentiator to cause the control means to operate the first mentioned Y-junction circulator so as to selectively apply through one of the two other legs of the first mentioned circulator microwave signals from the transmitter to one of the two other legs of the first circulator upon a recurrence differentiated signal of one sense being applied to the control means and to apply through the other of the two other legs of the first circulator microwave signals from the transmitter to another of the two other legs upon a recurrence differentiated signal of another sense being applied to the control means;

means responsive to the differentiated pulses from the first differentiator to cause the control means to operate the second Y-junction circulator so as to selectively apply through one of the two other legs of the second circulator microwave signals from one leg of the two other legs of the first mentioned circulator to one of the two other legs of the second circulator upon a recurrence differentiated signal of one sense being applied to the control means and to apply through the other of the two other legs of the second circulator microwave signals from the one leg of the first mentioned circulator to another of the two other legs of the second circulator upon a recurrence differentiated singal of another sense being applied to the control means; and other means responsive to the differentiated pulses from the first differentiator to cause the control means to operate the third Y-junction circulator so as to selectively apply through one of the two other legs of the third circulator microwave signals from the other leg of the two other legs of the first mentioned circulator to one of the two other legs of the third circulator upon a recurrence differentiated signal of one sense being applied to the control means and to apply through the other of the two other legs of the third circulator microwave signals from the other leg of the first mentioned circulator to another of the two other legs of the third circulator upon a recurrence differentiated signal of the other sense being applied to the control means.

5. A system for transmitting microwave signals in a predetermined sequence from antennas at various positions on a helicopter so as to avoid helicopter rotor modulation interference with the transmitted signals, the system comprising:

a signal pulse generator;

a light source mounted on the helicopter body;

a reflector mounted on blades of the rotor and arranged in cooperative relation with said light source to periodically reflect light therefrom upon rotation of the blades, means responsive to light from said source periodically reflected thereto by said reflector for producing an electrical signal in response to said reflected light, a microwave signal transmitter;

gating means responsive to the electrical signals from the signal producing means and the signal pulse generator to activate the transmitter to transmit microwave signals;

means responsive to pulses from the signal pulse generator for producing pulses of duration less than the duration of the pulse from the signal pulse generator;

a circulator having a base leg and two other legs spaced 120° from the base leg and from each other, means connecting the base leg of the circulator to the microwave signal transmitter, the circulator including control means responsive to electrical pulses form the pulse producing means to selectively apply the microwave signals transmitted to said base leg to one and the other of the two other legs of the circulator;

means connecting the two other legs of the circulator each to one of a pair of antennas for transmitting the microwave signals from said antennas.

6. The system defined by claim 5 wherein the means responsive to light from said source for producing an electrical signal includes:

a light sensor mounted on the helicopter for providing an electrical signal corresponding to the intensity of light impinging thereon;

a comparator effective to reject signals caused in the sensor by ambient light thereupon and to pass signals caused in the sensor by light from the light source being reflected from the reflector on the rotor blades to the light sensor;

means for delaying the passed electrical signals from the comparator for a period of time between that time at which an electrical signal from the sensor begins to that time when the helicopter rotor is in a position to effect least rotor modulation interference with the microwave signals transmitted from said antennas;

an amplifier connected between the delay means and the gating means.

7. The system defined by claim 5 wherein the pulse producing means includes:

a flip-flop to count down input pulses from the signal pulse generator so as to effect a series of output pulses of a duration longer than the input pulses from the signal pulse generator;

a differentiator connected between the output of the flip-flop and the control means of the circulator to differentiate the output pulses from the flip-flop;

whereby microwave signals transmitted to the base leg of the circulator may be selectively applied by the control means to one of the two other legs upon the differentiated pulse of one sense being applied to the control means and selectively applied by the control means to the other of the two other legs upon a differentiated pulse of another sense being applied to the control means.

8. The system defined by claim 5 wherein the means connecting the two other legs of the first mentioned circulator to different antennas includes:

a second Y-junction circulator having a base leg connected to one of the two other legs of the first mentioned circulator and having two other legs spaced 120° from the base leg and from each other, said second circulator including control means responsive to electrical pulses acting in one sense and another sense from the pulse producing means to selectively apply the microwave signals transmitted to the base leg of the second circulator to one of the other of the two other legs of said second circulator;

a third Y-junction circulator having a base leg connected to the other of the two other legs of the first mentioned circulator and having two other legs spaced 120° from the base leg and from each other, and the third circulator including control means responsive to electrical pulses acting in one sense and another sense from the pulse producing means to selectively apply the microwave signals transmitted to the base leg of the third circulator to one and the other of the two other legs of said third circulator; and means connecting each of the other legs of the second and third circulator to separate antennas for transmitting the selectively applied microwave signals from said antennas.

9. The system defined by claim 8 wherein the pulse producing means includes:

a first flip-flop to count down input pulses from the signal pulse generator so as to effect output pulses of a duration longer than the input pulses from the signal pulse generator;

a second flip-flop to count down pulses applied to the input thereof from the output of the first flip-flop so as to effect output pulses from the second flip-flop of a duration longer than the output pulses from the first flip-flop;

a differentiator connected between the output of the first flip-flop and the control means of the second and third circulators so as to differentiate the pulses from the first flip-flop; and another differentiator connected between the output of the second flip-flop and the control means of the first circulator so as to differentiate the pulses from the second flip-flop.

10. A system for transmitting microwave signals from an antenna mounted on an aircraft at intervals in time corresponding to predetermined propeller blade rotor positions at which least modulation interference with the transmitted microwave signals may be effected, the system comprising:

a signal generator;

a light energy sensor device;

a light energy applying device;

one of said devices being mounted on the aircraft and the other of the aforesaid devices being carried by the propeller blade;

the light sensor device including means responsive to light energy periodically applied by the other device upon rotation of the propeller blade for producing an electrical signal;

means for delaying the electrical signal from the signal producing means responsive to the applied light energy, the delay being an interval of time corresponding to the time between that time at which the electrical signal is produced and that time at which the propeller blade is in a position to effect the least rotor modulation interference with the microwave signal transmitted from the antenna;

means for gating signals from the delay means and the signal pulse generator;

means for modulating signals from the gating means;

a transmitter connected to the modulator and activated by the modulated signals to transmit microwave signals to the antenna.

11. A system for transmitting microwave signals from a plurality of spaced antennas carried by an aircraft and located in proximity to a rotatable member mounted on the aircraft and tending to effect modulation interference with the transmitted signals, the system comprising:

a signal pulse generator;

a light energy applying device;

a light energy sensor device;

one of said devices being mounted on the rotatable member;

the other of said devices being mounted on the aircraft in cooperative relation to the device on the rotatable member;

the light energy sensor device being responsive upon rotation of the member to light energy periodically applied by the light energy applying device for providing an electrical signal;

a microwave signal transmitter;

means responsive to electrical signals from the light sensor device and from the signal pulse generator to activate the transmitter to transmit microwave signals; and means responsive to signals from the signal pulse generator to sequentially circulate the microwave signals from the transmitter to the plurality of antennas.

12. The system as defined in claim 11 wherein the means responsive to electrical signals from the light sensor device and the signal pulse generator includes:

gating means to effect a signal on an output thereof upon electrical signals from the light sensor device and pulse generator being simultaneously effected to separate inputs of the gating means; and means for modulating signals from the gating means, said modulated signals activating the microwave signal transmitter.

13. The system as defined by claim 11 wherein the means to sequentially circulate the microwave signals from the transmitter to the plurality of antennas includes:

a circulator having a base leg and two other legs;

means connecting the two other legs of the circulator to the antennas;

other means connecting the transmitter to the base leg of the circulator;

the circulator including control means responsive to electrical pulses to selectively apply the microwave signals propagated from the transmitter through the other connecting means and the base leg of the circulator to the two other legs of the circulator;

flip-flop means to count down recurrent signals from the signal pulse generator and to effect recurrent signals of duration longer than the signal pulses from the signal generator; and means operatively connected between the control means and the flip-flop means to differentiate the recurrent signals from the flip-flop means so as to cause the control means to operate the circulator so as to apply through one of the two other legs of the circulator microwave signals from the transmitter to one of the antennas upon a recurrent signal of one sense being applied to the control means and to apply through the other of the two other legs of the circulator microwave signals from the transmitter to another of the antennas upon a recurrent signal of another sense being applied to the control means.

References Cited

UNITED STATES PATENTS

| | | | |
|---|---|---|---|
| 2,225,599 | 12/1940 | Gaty et al. | 89—133 |
| 3,088,109 | 4/1963 | Meyer | 343—100X |
| 3,267,472 | 8/1966 | Fink | 343—100 |

RODNEY D. BENNETT, JR., Primary Examiner

M. F. HUBLER, Assistant Examiner

U.S. Cl. X.R.

325—102; 343—100